United States Patent
Huang et al.

(10) Patent No.: US 10,814,270 B2
(45) Date of Patent: Oct. 27, 2020

(54) SELF-FORMING MEMBRANE FOR HIGH FLUX AND SELECTIVE ELECTROCHEMISTRY-BASED $CO_2$ CAPTURE

(71) Applicant: University of South Carolina, Columbia, SC (US)

(72) Inventors: Kevin Huang, Columbia, SC (US); Peng Zhang, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 231 days.

(21) Appl. No.: 15/975,807

(22) Filed: May 10, 2018

(65) Prior Publication Data

US 2019/0022576 A1   Jan. 24, 2019

Related U.S. Application Data

(60) Provisional application No. 62/533,769, filed on Jul. 18, 2017.

(51) Int. Cl.
*B01D 53/22* (2006.01)
*B01D 69/14* (2006.01)
(Continued)

(52) U.S. Cl.
CPC ....... *B01D 53/228* (2013.01); *B01D 67/0041* (2013.01); *B01D 67/0083* (2013.01);
(Continued)

(58) Field of Classification Search
CPC .. B01D 53/22; B01D 53/228; B01D 67/0041; B01D 67/0074; B01D 67/0083;
(Continued)

(56) References Cited

U.S. PATENT DOCUMENTS

| 6,793,711 B1* | 9/2004 | Sammells | B01D 69/141 |
| | | | 204/400 |
| 2008/0115667 A1* | 5/2008 | Lee | B01D 53/228 |
| | | | 95/51 |

(Continued)

OTHER PUBLICATIONS

Anderson et al., Carbonate-ceramic dual-phase membrane for carbon dioxide separation, Journal of Membrane Science, 357, 2010, 122-129.
(Continued)

*Primary Examiner* — Jason M Greene
(74) *Attorney, Agent, or Firm* — Dority & Manning, P.A.

(57) ABSTRACT

A low-cost and easy-to-fabricate mixed $e^-$ and $CO_3^{2-}$ conducting membrane for advanced high-flux and selective electrochemical $CO_2$ separation from flue gas is provided. The membrane includes a $CO_3^{2-}$-conducting molten carbonate phase and an $e^-$-conducting lithiated Ni-oxide interphase that can be formed in situ during operation. The membrane exhibits a $CO_2$ flux density greater than 0.8 mL/(minute·cm$^2$) at 850° C. with a selectivity ranging from about 100 to about 500 and excellent stability for up to about 450 hours. Further, the self-formed interphase $Li_{0.4}Ni_{1.6}O_2$ is highly electron conducting and can provide electrons to the co-reduction of $CO_2$ and $O_2$ into $CO_3^{2-}$. Such a membrane is an alternative to the conventional "size-sieving" inorganic and "dissolution-diffusion" organic counterparts for $CO_2$ capture from flue gas.

16 Claims, 16 Drawing Sheets

(51) Int. Cl.
      B01D 67/00   (2006.01)
      B01D 69/10   (2006.01)
      B01D 71/02   (2006.01)
      B01D 69/02   (2006.01)
(52) U.S. Cl.
      CPC ......... *B01D 67/0088* (2013.01); *B01D 69/10* (2013.01); *B01D 69/141* (2013.01); *B01D 67/0074* (2013.01); *B01D 69/02* (2013.01); *B01D 71/024* (2013.01); *B01D 2257/104* (2013.01); *B01D 2257/504* (2013.01); *B01D 2258/0283* (2013.01); *B01D 2323/08* (2013.01); *B01D 2325/04* (2013.01); *B01D 2325/20* (2013.01)
(58) Field of Classification Search
      CPC .... B01D 67/0088; B01D 69/02; B01D 69/10; B01D 69/12; B01D 69/125; B01D 69/141; B01D 71/024; B01D 2257/104; B01D 2257/504; B01D 2258/0283; B01D 2323/08
      See application file for complete search history.

(56) References Cited

U.S. PATENT DOCUMENTS

| | | | | |
|---|---|---|---|---|
| 2009/0101008 | A1* | 4/2009 | Lackner | B01D 53/228 95/51 |
| 2011/0168572 | A1* | 7/2011 | Huang | B01D 53/228 205/763 |
| 2012/0014852 | A1* | 1/2012 | Huang | B01D 53/228 423/210.5 |
| 2015/0090125 | A1* | 4/2015 | Lin | B01D 53/228 96/11 |

OTHER PUBLICATIONS

Bae et al., Evaluation of cation-exchanged zeolite adsorbents for post-combustion carbon dioxide capture, Energy & Environmental Science, 6, 2013, 128-138.
Chung et al., Dual-Phase Metal-Carbonate Membrane for High-Temperature Carbon Dioxide Separation, Industrial & Engineering Chemistry Research, 44, 2005, 7999-8006.
Dicks et al., Molten carbonate fuel cells, Current Opinion in Solid State & Materials Science, 8-5, 2004, 379-383.
Dong et al., An asymmetric tubular ceramic-carbonate dual phase membrane for high temperature $CO_2$ separation, Chemical Communications, 49, 2013, 9654-9656.
Dowson et al., Fast and selective separation of carbon dioxide from dilute streams by pressure swing adsorption using solid ionic liquids, Faraday Discussions, 192, 2016, 511-527.
Du et al., Polymer nanosieve membranes for $CO_2$-capture applications, nature materials, 10, 2011, 372-375.
Fang et al., A superior mixed electron and carbonate-ion conducting metal-carbonate composite membrane for advanced flue-gas carbon capture, Journal of Membrane Science, 505, 2016, 225-230.
Huck et al., Evaluating different classes of porous materials for carbon capture, Energy & Environmental Science, 7, 2014, 4132-4146.
Kalyani et al., Various aspects of $LiNiO_2$ chemistry: A review, Science and Technology of Advanced Materials, 6, 2005, 689-703.
Lin et al., In silico screening of carbon-capture materials, Nature Materials, 11, 2012, 633:641.
Lu et al., Synthesis and characterization of thin ceramic-carbonate dual-phase membranes for carbon dioxide separation, Journal of Membrane Science, 444, 2013, 402-411.
Naeem et al., The development of effective CaO-based $CO_2$ sorbents via a sacrificial templating technique, Faraday Discussions, 192, 2016, 85-95.

Norton et al., Ceramic-carbonate dual-phase membrane with improved chemical stability for carbon dioxide separation at high temperature, Solid State Ionics, 263, 2014, 172-179.
Rao et al., A Technical, Economic, and Environmental Assessment of Amine-Based $CO_2$ Capture Technology for Power Plant Greenhouse Gas Control, Environmental Science Technology, 36, 2002, 4467-4475.
Rochelle, Amine Scrubbing for $CO_2$ Capture, Science, 325, 2009, 1652-1654.
Samanta et al., Post-Combustion $CO_2$ Capture Using Solid Sorbents: A Review, Industrial & Engineering Chemistry Research, 51, 2012, 1438-1463.
Shin et al., Synthesis and $CO_2/N_2$ gas permeation characteristics of ZSM-5 zeolite membranes, Microporous and Mesoporous Materials, 85, 2005, 313-323.
Smit, Carbon Capture and Storage: introductory lecture, Faraday Discussions, 192, 2016, 9-25.
Steele et al., Nature, 414, 2001, 345-352.
Sutter et al., A low-energy chilled ammonia process exploiting controlled solid formation for post-combination $CO_2$ capture, Faraday Discussions, 2016, 192, 2016, 59-83.
Tong et al., Electrochemical Capture of $CO_2$ from Natural Gas Using a High-Temperature Ceramic-Carbonate Membrane, Journal of The Electrochemical Society, 162-4, 2015, E43-E46.
Tong et al., Electrochemical separation of $CO_2$ from a simulated flue gas with high-temperature ceramic-carbonate membrane: New observations, Journal of Membrane Science, 477, 2015, 1-6.
Tong et al., Stabilizing electrochemical carbon capture membrane with $Al_2O_3$ thin-film overcoating synthesized by chemical vapor deposition, Chemical Communications, 51, 2015, 2936-2938.
Vaidhyanathan et al., Direct Observation and Quantification of $CO_2$ Binding Within an Amine-Functionalized Nanoporous Solid, Science, 3330, 2010, 650-653.
Valverde et al., Enhancement of Fast $CO_2$ Capture by a Nano-$SiO_2$/CaO Composite at Ca-Looping Conditions, Environmental Science & Technology, 46, 2012, 6401-6408.
Veltman et al., Human and Environmental Impact Assessment of Postcombustion $CO_2$ Capture Focusing on Emissions from Amine-Based Scrubbing Solvents to Air, Environmental Science Technology, 44, 2010, 1496-1502.
Wang et al., $CO_2$ capture by solid adsorbents and their applications: current status and new trends, Energy & Environmental Science, 4, 2011, 42-55.
Wei et al., A Controllable Synthesis of Rich Nitrogen-Doped Ordered Mesoporous Carbon for $CO_2$ Capture and Supercapacitors, Advanced Functional Materials, 23, 2013, 2322-2328.
Xomeritakis et al., Anodic alumina supported dual-layer microporous silica membranes, Journal of Membrane Science, 287, 2007, 157-161.
Xu et al., Silver-molten carbonate composite as a new high-flux membrane for electrochemical separation of $CO_2$ from flue gas, Journal of Membrane Science, 401-402, 2012, 190-194.
Zhang et al., Combining Electrochemical $CO_2$ Capture with Catalytic Dry Methane Reforming in a Single Reactor for Low-Cost Syngas Production, ACS Sustainable Chemistry & Engineering, 4, 2016, 7056-7065.
Zhang et al., Flux of silver-carbonate membranes for post-combustion $CO_2$ capture: The effects of membrane thickness, gas concentration and time, Journal of Membrane Science, 455, 2014, 162-167.
Zhang et al., High $CO_2$ permeation flux enabled by highly interconnected three-dimensional ionic channels in selective $CO_2$ separation membranes, Energy & Enironmental Science, 5, 2012, 8310-8317.
Zhang et al., Stabilizing a high-temperature electrochemical silver-carbonate $CO_2$ capture membrane by atomic layer deposition of a $ZrO_2$ overcoat, Chemical Communications, 52, 2016, 9817-9820.
Zhang et al., Surface modified silver-carbonate mixed conducting membranes for high flux $CO_2$ separation with enhanced stability, Journal of Membrane Science, 453, 2014, 36-41.

* cited by examiner

SELF-FORMING MEMBRANE FOR HIGH FLUX AND SELECTIVE ELECTROCHEMISTRY-BASED $CO_2$ CAPTURE

CROSS-REFERENCE TO RELATED APPLICATION

The present application claims priority to U.S. Provisional Application Ser. No. 62/533,769 filed on Jul. 18, 2017, the disclosure of which is incorporated by reference herein.

STATEMENT AS TO RIGHTS TO INVENTIONS MADE UNDER FEDERALLY SPONSORED RESEARCH

This invention was made with Government support under Contract Nos. CBET-1340269 and CBET-1401280, awarded by the National Science Foundation. The Government has certain rights in the invention.

BACKGROUND

A central effort to battle the increasing global warming and climate change is to reduce $CO_2$ emissions to the atmosphere from baseload centralized coal-fired power plants. Currently, the state-of-the-art technology for such flue-gas $CO_2$ capture utilizes amine scrubbing. Unfortunately, this "chemical washing" process is energy intensive, costly and cumbersome, which has become the major hurdle to a widespread deployment. The estimated parasitic energy for the current amine scrubbing process is 702 kilojoules per kilogram of carbon dioxide (kJ $kg_{CO2}^{-1}$), which is about four times the thermodynamic minimum. While significant progress toward cost reduction and energy savings has been made in recent years, a large-scale commercial deployment of amine technology for $CO_2$ capture depends on whether the cost and efficiency penalties are acceptable by the market. Thus, developing alternative energy-efficient and cost-effective carbon capture technologies is still of great interest.

Dual-phase mixed $O^{2-}/e^-$ and $CO_3^{2-}$ conductors represent a new class of membranes that have emerged in recent years for high-temperature, high-flux, and selective $CO_2$ capture from flue gas and fuel gas. In contrast to conventional size-sieving inorganic and solution-diffusion organic low-temperature rivalries, this new class of membranes can directly capture $CO_2$ from high-temperature combustion streams in the form of $CO_3^{2-}$ under the gradient of electrochemical potentials of $CO_2$ (and $O_2$) across the membrane. To charge balance the flow of $CO_3^{2-}$, a flow of counter-ion moving in the opposite direction is necessary. In practice, the counter-ion can be provided by either a solid metal ($e^-$) or a solid $O^{2-}$ conducting oxide, which in turn also serves as the porous framework to immobilize the molten carbonate. The former metal-carbonate composite is referred to as mixed electron and carbon-ion conductor (or MECC), whereas the latter oxide-carbonate is referenced as mixed oxide-ion and carbonate-ion conductor (or MOCC).

Among these two types of dual-phase mixed conducting membranes, MECC is of particular interest because of its ability to directly separate $CO_2$ and $O_2$ from flue gas, which is a major source of $CO_2$ emission on the earth. The first proof-of-concept of a MECC membrane employed stainless steel as the electron conducting phase. However, due to the severe corrosion problem by molten carbonate (MC), the membrane could not maintain a stable flux for a prolonged period. Recently, silver, a metal that chemically inert to MC, has been utilized as the solid electron conducting phase, where high flux with much improved stability were achieved. However, one of the problems with silver-based MECC membranes is the silver's propensity to sinter at high temperatures, causing gradual degradation in flux. In addition, the high cost of silver is another concern for future scaled-up applications, even though the coarsening issue can be mitigated to certain degree by overcoating the porous silver matrix with a layer of $Al_2O_3$ or $ZrO_2$.

As such, a need exists for an MECC membrane for use in the separation of $CO_2$ that is easily fabricated, that is cost effective, and that can withstand high temperatures without exhibiting a degradation in flux.

SUMMARY OF THE INVENTION

In one embodiment of the present invention, a membrane for carbon dioxide and oxygen separation is provided. The membrane includes a solid porous matrix; a molten carbonate phase; and an interphase disposed between the solid oxide porous substrate phase and the molten carbonate phase, where the membrane is a mixed electron and carbon-ion conductor membrane, and where the membrane exhibits a selectivity for carbon dioxide and oxygen over nitrogen ranging from about 100 to about 500 at a temperature of about 850° C.

In another embodiment, the solid oxide porous substrate can include a metal oxide, where the metal oxide includes nickel oxide, iron oxide, manganese oxide, cobalt oxide, or copper oxide.

In still another embodiment, the solid porous matrix can be impregnated with the molten carbonate phase.

In yet another embodiment, a volume % ratio of the solid porous matrix to the molten carbonate phase is from about 1.1 to about 1.8 prior to activation of the membrane by application of heat.

In one more embodiment, the interphase can be self-formed upon increasing the temperature of the membrane to a temperature ranging from about 650° C. to about 850° C.

In an additional embodiment, the interphase can include a lithiated metal oxide having the following formula: $Li_xB_{2-x}O_2$ where B is nickel, iron, manganese, cobalt, or copper nickel oxide. For instance, the lithiated metal oxide can be a lithiated nickel oxide such as $Li_{0.4}Ni_{1.6}O_2$.

In one particular embodiment, the membrane can have a thickness ranging from about 0.6 millimeters to about 4 millimeters.

In another embodiment, the interphase can have a thickness ranging from about 50 nanometers to about 150 nanometers.

In still another embodiment, the membrane can exhibit a carbon dioxide flux density ranging from about 0.95 milliliters/(minute·cm$^2$) to about 1.5 milliliters/(minute·cm$^2$) at a temperature of about 850° C.

In another embodiment of the present invention, a method of forming a membrane for carbon dioxide separation is provided. The method includes forming a solid porous matrix; impregnating the solid porous matrix with a molten carbonate phase; and heating the molten carbonate phase impregnated solid porous matrix to a temperature ranging from about 650° C. to about 850° C., where an interphase is formed in situ between the solid porous matrix and the molten carbonate phase, where the membrane is a mixed electron and carbon-ion conductor membrane.

In one embodiment, the membrane can exhibit a selectivity for carbon dioxide and oxygen over nitrogen ranging from about 100 to about 500 at a temperature of about 850° C.

In still another embodiment, the solid oxide porous substrate can include a metal oxide, wherein the metal oxide includes nickel oxide, iron oxide, manganese oxide, cobalt oxide, or copper oxide.

In yet another embodiment, the interphase can include a lithiated metal oxide having the following formula: $Li_xB_{2-x}O_2$, where B is nickel, iron, manganese, cobalt, or copper. For instance, the lithiated metal oxide can be a lithiated nickel oxide such as $Li_{0.4}Ni_{1.6}O_2$.

In one more embodiment, the membrane can have a thickness ranging from about 0.6 millimeters to about 4 millimeters.

In an additional embodiment, the interphase can have a thickness ranging from about 50 nanometers to about 150 nanometers.

In another embodiment, the membrane can exhibit a carbon dioxide flux density ranging from about 0.95 milliliters/(minute·cm$^2$) to about 1.5 milliliters/(minute·cm$^2$) at a temperature of about 850° C.

In still another embodiment, a volume % ratio of the solid porous matrix to the molten carbonate phase can be about 1.1 to about 1.8 prior to heating the molten carbonate phase impregnated solid porous matrix.

A method of separating carbon dioxide, oxygen, or a combination thereof from a stream of flue gas is also contemplated, where the method includes contacting the stream of flue gas with the membrane described above.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

FIG. 7(a2) is an image showing the elemental mapping of the membrane shown in FIG. 7(a), where the mapping is for sodium (Na).

FIG. 7(a3) is an image showing the elemental mapping of the membrane shown in FIG. 7(a), where the mapping is for oxygen (O).

FIG. 7(a4) is an image showing the elemental mapping of the membrane shown in FIG. 7(a), where the mapping is for carbon (C).

FIG. 7(b1) is an image showing the elemental mapping of the membrane shown in FIG. 7(b), where the mapping is for nickel (Ni).

FIG. 7(b2) is an image showing the elemental mapping of the membrane shown in FIG. 7(b), where the mapping is for sodium (Na).

FIG. 7(b3) is an image showing the elemental mapping of the membrane shown in FIG. 7(b), where the mapping is for oxygen (O).

FIG. 7(b4) is an image showing the elemental mapping of the membrane shown in FIG. 7(b), where the mapping is for carbon (C).

$Li_2CO_3$ ($NiO:Li_2CO_3=1.6:0.22$ mol %) mixture in air at a temperature ranging of Room Temperature (about 21° C.) to 850° C.

Figure 9A:
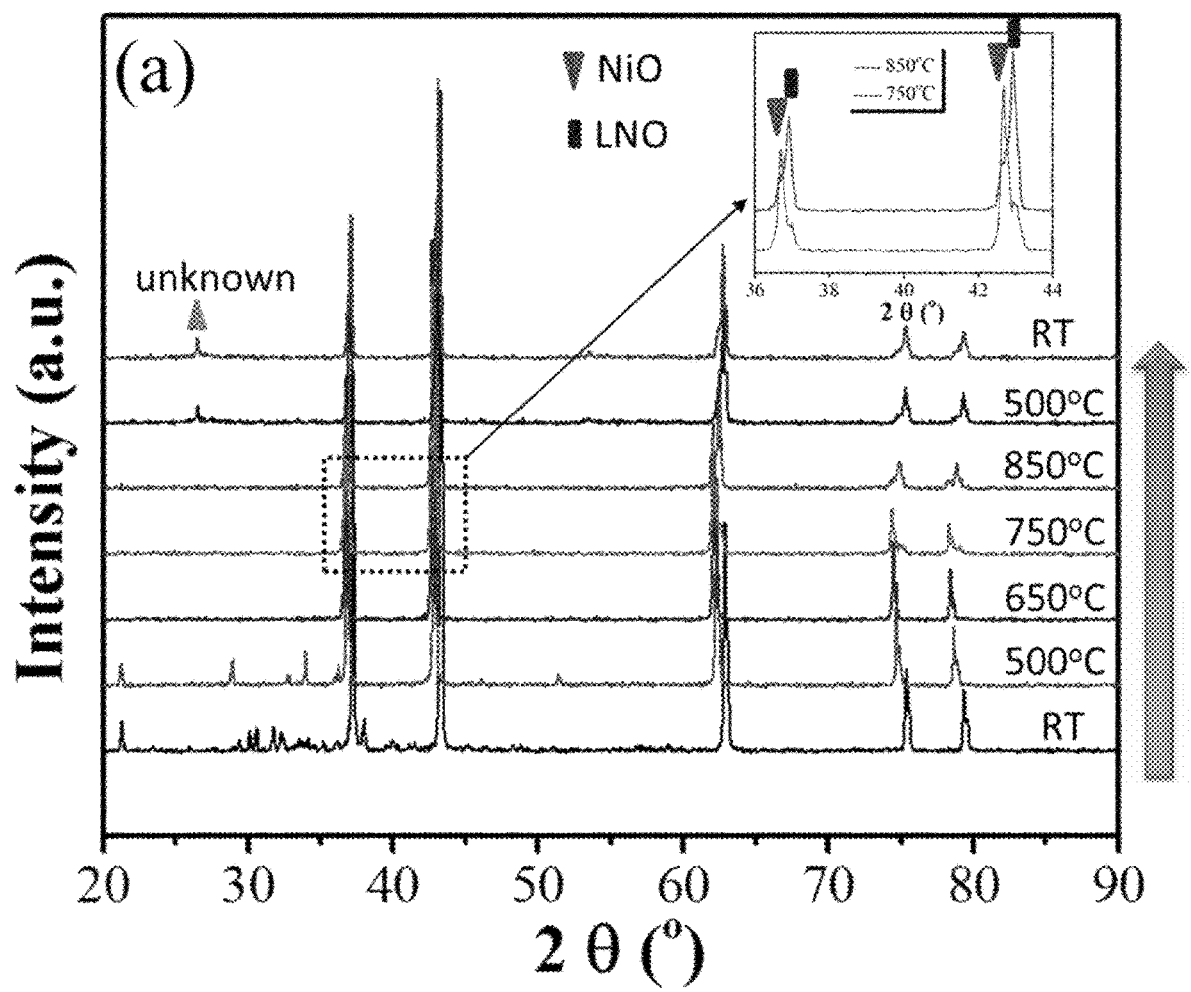
FIG. 9(a) is a graph illustrating the in situ high-temperature X-ray diffraction (HT-XRD) analyzing on an NiO—
Figure 9B:
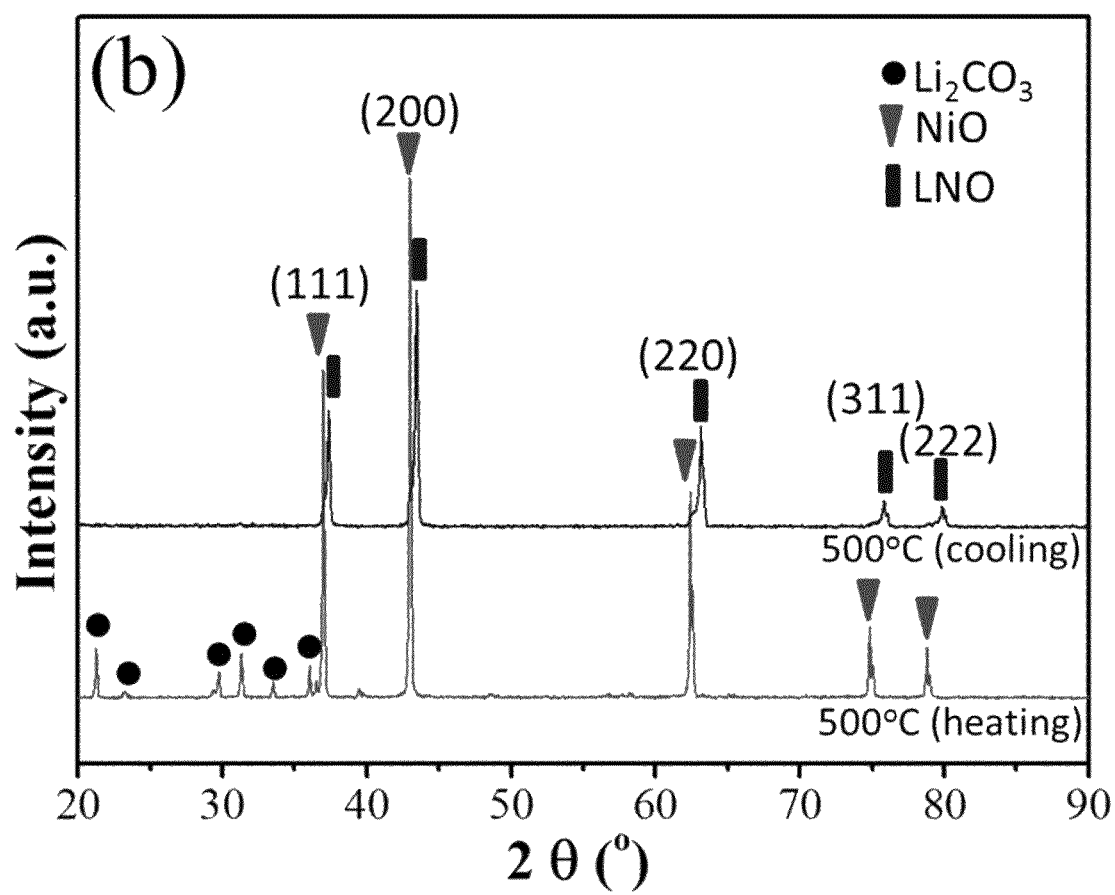

FIG. 9(b) is a graph comparing the in situ high-temperature X-ray diffraction (HT-XRD) analyzing on an NiO—$Li_2CO_3$ ($NiO:Li_2CO_3=1.6:0.22$ mol %) mixture in air at a temperature during cooling at 500° C. versus heating at 500° C.

Figure 10:
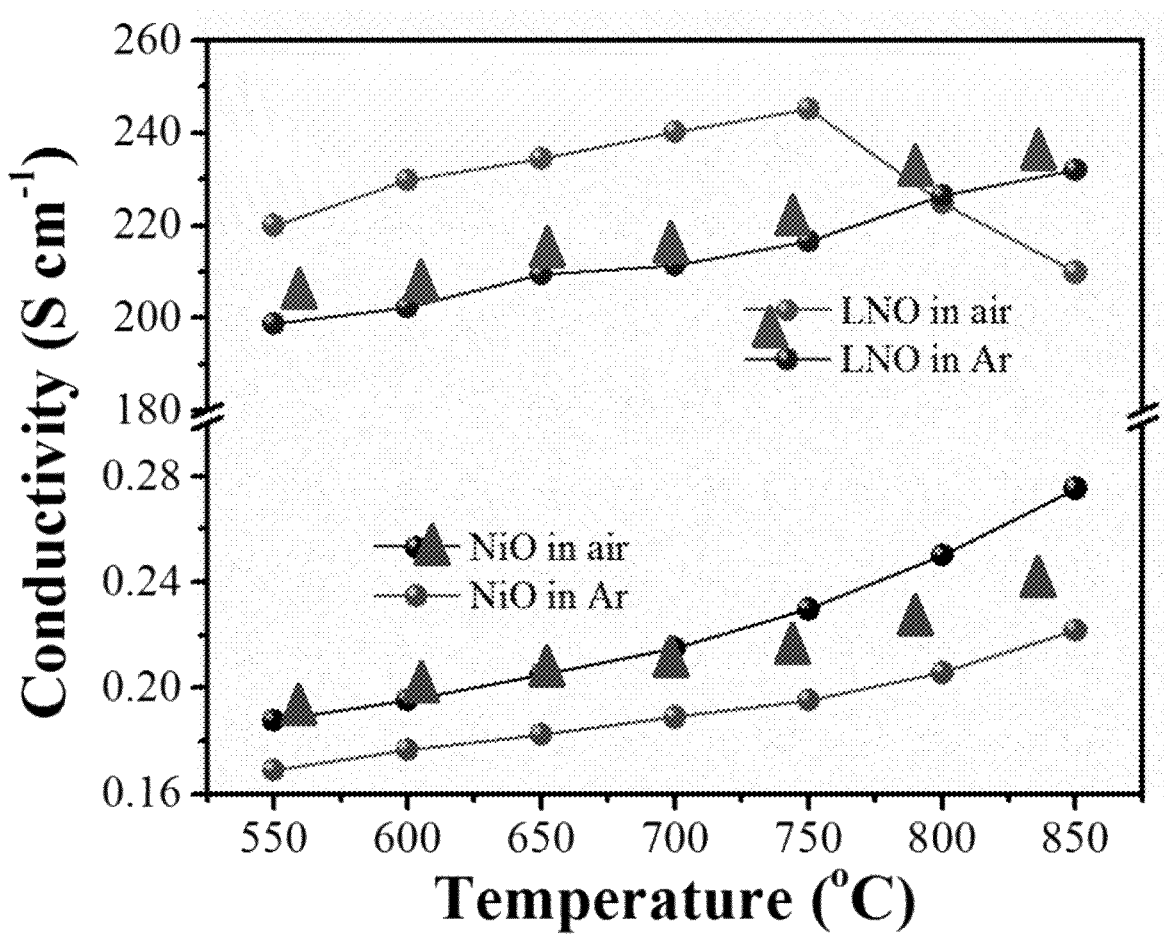

FIG. 10 is a graph showing the electrical conductivity of NiO and LNO versus temperature in air and Argon (Ar) gas.

Figure 11:
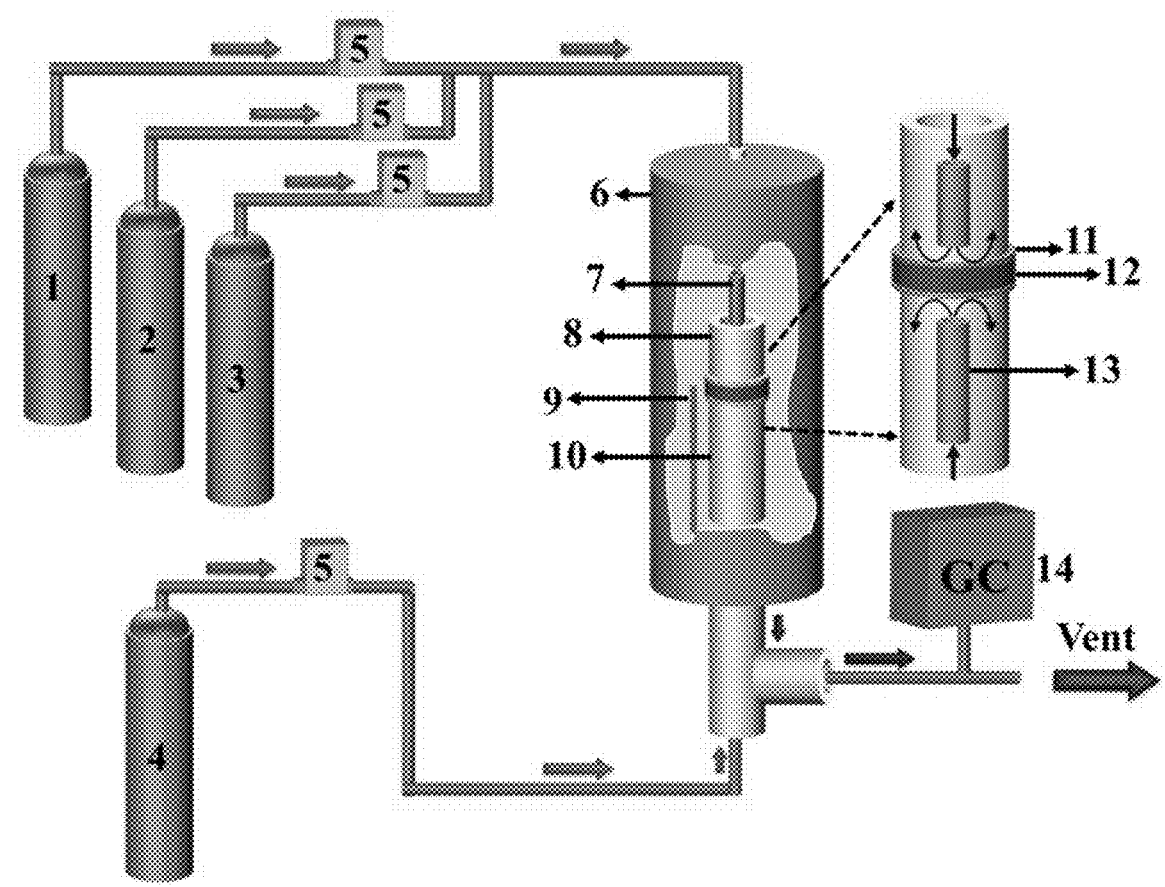

FIG. 11 is a schematic of a $CO_2$ permeation cell in which the MECC membrane of the present invention can be utilized.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present invention is directed to a low-cost and easy-to-fabricate mixed electron and carbonate-ion conducting membrane for advanced high-flux and selective electrochemical $CO_2$ separation from flue gas. The membrane can include a carbonate-ion conducting molten carbonate phase and an electron conducting lithiated nickel (Ni)-oxide interphase that is formed in situ during operation. The testing results in the examples below explicitly show that the membrane contemplated by the present invention is capable of achieving a $CO_2$ flux density that is greater than about 0.95 milliliters/(minute·cm²) with a selectivity ranging from about 100 to about 500 at 850° C. and excellent stability for up to about 450 hours. Evidence is also provided to support that the self-formed interphase is $Li_{0.4}Ni_{1.6}O_2$ is highly electron conducting and responsible for providing electrons to the co-reduction of $CO_2$ and $O_2$ into carbonate-ion ($CO_3^{2-}$). Given the performance level demonstrated, this low-cost and easy-to-fabricate membrane is superior to the conventional "size-sieving" inorganic and "dissolution-diffusion" organic counterparts, promising it to be a very competitive technology for future advanced $CO_2$ capture from flue gas.

Specifically, the membrane can include a mixed electron and carbon-ion conductor (or MECC) membrane that includes a solid porous matrix. The solid porous matrix can include a metal oxide such as a manganese (Mn) oxide, an iron (Fe) oxide, a cobalt (Co) oxide, a copper (Cu) oxide, or any suitable complex oxide that can be lithiated to form an interphase layer that includes a lithiated metal oxide as represented by the formula $Li_xB_{2-x}O_2$, where B is Fe, Mn, Ni, Co, or Cu. In one particular embodiment, the solid porous matrix includes a nickel oxide (NiO) matrix as the solid electron conducting phase, which is impregnated with a molten carbonate (MC) phase, where the molten carbonate serves as the carbon-ion conducting phase. The molten carbonate used to form the MECC membrane can, for example, include a eutectic mixture of $Li_2CO_3$ and $Na_2CO_3$ at a mole % ratio of $Li_2CO_3$ to $Na_2CO_3$ ranging from about 1.01 to about 1.3, such as from about 1.02 to about 1.2, such as from about 1.04 to about 1.1. In one particular embodiment, the molten carbonate can include about 52 mol % $Li_2CO_3$ and 48 mol % $Na_2CO_3$.

Figure 1:
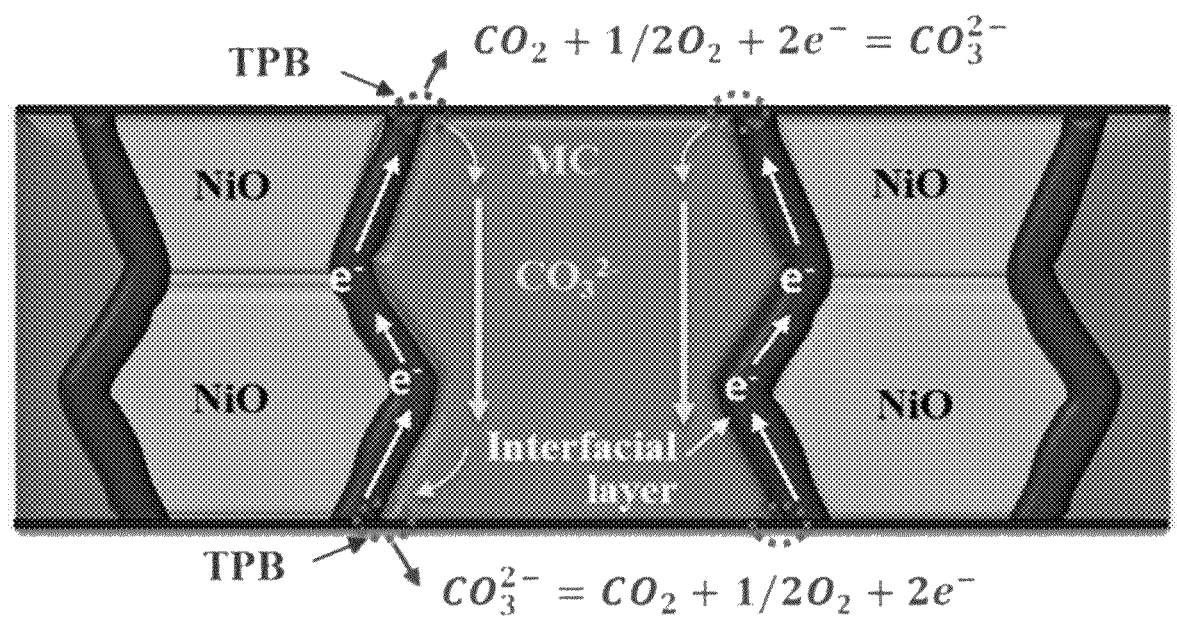
FIG. 1 is a schematic illustration of a self-forming mixed electron and carbon-ion conductor (or MECC) membrane according to one embodiment of the present invention.

Further, the pre-activation NiO-MC MECC membrane can have a volume % ratio of NiO to MC ranging from about 1.1 to about 1.8, such as from about 1.2 to about 1.7, such as from about 1.3 to about 1.6. In one particular embodiment, the NiO can be present at volume % of about 60 vol %, while the MC can be present at a volume % of about 40 vol %. At high temperatures, such as a temperatures of about 750° C., the NiO phase spontaneously reacts with MC phase, self-forming an electron conductive lithiated NiO layer (e.g., $Li_{0.4}Ni_{1.6}O_2$) at the interface of the NiO and MC to serve as an electron conductor and enable the $CO_2$-capture reaction $CO_2+\frac{1}{2}O_2+2e^-=CO_3^{2-}$ at the $CO_2$—$O_2/e^-/CO_3^{2-}$ triple phase boundaries (TPBs). Such a self-forming MECC membrane is schematically illustrated in FIG. 1 with $e^-$ and $CO_3^{2-}$ conducting pathways and relevant charge-transfer reactions.

The resulting membrane can have a thickness ranging from about 0.6 millimeters (mm) to about 4 mm, such as from about 0.7 mm to about 3.5 mm, such as from about 0.8 mm to about 3 mm. Further, the self-formed interphase can have a thickness ranging from about 50 nanometers (nm) to about 150 nm, such as from about 75 nm to about 125 nm, such as from about 90 nm to about 110 nm. In addition, the membrane can exhibit a selectivity for carbon dioxide and oxygen over nitrogen at a temperature of about 850° C. ranging from about 100 to about 500, such as from about 125 to about 495, such as from about 150 to about 490 over an extended time period, such as a time period ranging from about 1 hour to about 500 hours, such as from about 10 hours to about 475 hours, such as from about 100 hours to about 450 hours. Moreover, the membrane is capable of achieving a $CO_2$ flux density ranging from about 0.80 milliliters/(minute·cm²) to about 1.5 milliliters/(minute·cm²), such as from about 0.85 milliliters/(minute·cm²) to about 1.4 milliliters/(minute·cm²), about 0.90 milliliters/(minute·cm²) to about 1.3 milliliters/(minute·cm²) at a temperature of about 850° C. and over an extended time period, such as a time period ranging from about 1 hour to about 500 hours, such as from about 10 hours to about 475 hours, such as from about 100 hours to about 450 hours. Further, it is capable of achieving an $O_2$ flux density ranging from about 0.35 milliliters/(minute·cm²) to about 0.65 milliliters/(minute·cm²), such as from about 0.40 milliliters/(minute·cm²) to about 0.60 milliliters/(minute·cm²), about 0.45 milliliters/(minute·cm²) to about 0.55 milliliters/(minute cm²) at a temperature of about 850° C. and over an extended time period, such as a time period ranging from about 1 hour to about 500 hours, such as from about 10 hours to about 475 hours, such as from about 100 hours to about 450 hours. In contrast, silver and molten carbonate based membranes exhibit decreased selectivity and flux.

Further, the membrane of the present invention can exhibit a $CO_2$ permeance of about $4.5\times10^{-7}$ mol m$^{-2}$ s$^{-1}$ Pa$^{-1}$ to about $7\times10^{-7}$ mol m$^{-2}$ s$^{-1}$ Pa$^{-1}$, such as from about $4.75\times10^{-7}$ mol m$^{-2}$ s$^{-1}$ Pa$^{-1}$ to about $6.75\times10^{-7}$ mol m$^{-2}$ s$^{-1}$ Pa$^{-1}$, such as from about $5\times10^{-7}$ mol m$^{-2}$ s$^{-1}$ Pa$^1$ to about $6.5 \times 10^{-7}$ mol m$^{-2}$ s$^{-1}$ Pa$^{-1}$ at 850° C. and at a selectivity ranging from about 430 to about 470. In addition, the interphase (e.g., the lithiated nickel oxide (LNO) layer) of the membrane of the present invention can exhibit a conductivity in air or argon (Ar) ranging from about 180 S/cm to about 300 S/cm, such as from about 190 S/cm to about 280 S/cm, such as from about 200 S/cm to about 260 S/cm at temperatures ranging from about 550° C. to about 850° C. Such high levels of electrical conductivity measurement confirm that LNO is a highly conductive phase and is responsible for the observed $CO_2$ transport in the NiO-MC based MECC membrane contemplated by the present invention.

In order to form and activate the membrane of the present invention such that is at least partially conducting to enable the transport and separation of $CO_2$ and $O_2$ from flue gas, a solid porous matrix is first provided, where the solid porous matrix can include nickel oxide. Then, the solid porous matrix is impregnated with a molten carbonate phase, after which the solid porous matrix and molten carbonate are heated to a temperature ranging from about 650° C. to about 850° C., such as from about 675° C. to about 825° C., such as from about 700° C. to about 800° C., which results in the in situ formation of an interphase layer due to the spontaneous reaction of the nickel oxide matrix with the MC phase, self-forming an electron conductive lithiated NiO layer (e.g., $Li_{0.4}Ni_{1.6}O_2$) at the interface of the NiO and MC to serve as an electron conductor and enable the $CO_2$-capture reaction $CO_2 + \frac{1}{2}O_2 + 2e^- = CO_3^{2-}$ at the $CO_2$—$O_2$/$e^-$/$CO_3^{2-}$ triple phase boundaries (TPBs). The resulting membrane can then be used to separate carbon dioxide and oxygen from a stream of flue gas by contacting the stream of flue gas with the membrane.

The present invention may be better understood with reference to the following example.

EXAMPLE 1

Example 1 discusses various test data compiled for the mixed electron and carbon-ion conductor (or MECC) membrane of the present invention.

METHODS

Sample Preparation

The porous NiO matrix was prepared as follows. Briefly, NiO powder (99.9% metal basis, Alfa Aesar) were intimately mixed in ethanol with carbon black as a pore former at volume ratios of NiO powder to carbon black of 5:5, 6:4, 7:3 and 8:2, respectively. The dried powder mixtures were then pressed into pellets under 70 MPa pressure, followed by sintering at 1,350° C. for 12 hours in air to remove the carbon pore former and achieve good mechanical strength. The fabricated porous NiO matrix was then impregnated with a 52 mol % $Li_2CO_3$-48 mol % $Na_2CO_3$ molten carbonate (denoted as MC) at 650° C. for 2 hours to form a dense membrane. The weight increase of the pellet after MC impregnation was about 20%. After MC infiltration, the surface of the resulting NiO-MC membrane was thoroughly cleaned by sandpaper.

Flux Measurement

The flux densities of $CO_2$—$O_2$ permeation of the membrane were evaluated by a homemade permeation cell system as shown in FIG. 11 where the system includes a $CO_2$ cylinder 1, a nitrogen cylinder 2, an oxygen cylinder 3, an argon cylinder 4, mass flow controllers 5, furnace 6, inner feed tube 7, short alumina tube 8, thermocouple 9, supporting alumina tube 10, sealant 11, NiO-MC dual-phase membrane 12, inner sweep tube 13, and gas chromatography apparatus 14. Briefly, to assemble the cell, a dense NiO-MC membrane 12 was first sealed to a supporting alumina tube 10 by a commercial silver paste as the sealant 11 (Shanghai Research Institute of Synthetic Resins). A short alumina tube 8 was then mounted to the top surface of the NiO-MC membrane 12 to shield the feed gas. The feed gas was a simulated flue gas, with a 100 standard cubic centimeters per minute (sccm) flow of the mixture containing 15% $CO_2$, 10% $O_2$ and 75% $N_2$ as controlled by mass flow controllers 4 and delivered from cylinders 1-4. $N_2$ was used as a tracer gas for leak correction if any. The sweep gas was Ar flowed at 50 milliliters per minute. The concentrations of $CO_2$, $O_2$ and $N_2$ in the effluent were analyzed by an on-line gas chromatographer (Agilent 490). Commercial mass flow controllers 5 (Smart-Trak, 50 Series) specifically calibrated for each gas under use were employed to control the gas flow rates. The temperature studied was varied from 650° C. to 850° C. with a step size of 50° C. At each temperature, the membranes were allowed to reach equilibrium over a time period of about 2 hours before gas chromatography (GC) sampling. The final concentrations of $CO_2$, $O_2$ and $N_2$ were taken as an average of a total of consecutive 10 GC readings. The final $CO_2$ and $O_2$ flux densities ($J_{CO2}$ and $J_{O2}$) were calculated by:

$$J_{CO_2} = \frac{C_{CO_2}}{(1 - C_{CO_2} - C_{O_2} - C_{N_2})} \times \frac{Q}{A} \quad (1)$$

$$J_{O_2} = \frac{C_{O_2}}{(1 - C_{CO_2} - C_{O_2} - C_{N_2})} \times \frac{Q}{A} \quad (2)$$

where $C_{CO_2}$, $C_{O_2}$ and $C_{N_2}$ are the measured concentrations of $CO_2$, $O_2$ and $N_2$, respectively; Q is the flow rate of the Ar sweep gas (i.e., 50 sccm); and A is the effective area of the sample (i.e., 0.921 cm$^2$).

X-Ray Diffraction

The room temperature phase compositions of NiO, MC and NiO-MC after firing at 850° C. were examined by an X-ray diffractometer (Rigaku, Japan) equipped with a graphite-monochromatized CuKa radiation ($\lambda$=1.5418 Å). The 2θ scans were performed at a rate of 8° min$^{-1}$ in a range of 20°-90°. The high-temperature XRD was performed in a temperature range of 550° C.–800° C. in air using a high-temperature (HT) X-ray diffractometer (X1 Theta-Theta, Scintag, USA) equipped with graphite-monochromatized Cu Kα radiation ($\lambda$=1.5418 Å) over a 2θ=20°-90° range in a step size of 0.02° at a scanning rate of 1° per minute. During the measurement, approximately 1 hour of equilibrium time was given at each temperature before data collection.

SEM/TEM Examination

The cross-sectional views of the NiO-MC membrane before and after testing were characterized by a scanning electron microscope (SEM) (FESEM, Zeiss Ultra) equipped with Energy dispersive X-ray spectrometry (EDX). The Focused Ion Beam (FIB, Hitachi NB-5000) technique was used to prepare sample from a post-tested NiO-MC membrane for TEM (H-9500, Hitachi) imaging and chemical analysis. The procedure to prepare FIB sample includes: 1) deposition of a carbon layer (4×12 microns) using Ga-gun on top surface of the sample; 2) deposition of a W layer (4×12 microns) using Ga-gun on top of the C layer; 3) use of 40 kV and 68.36 nA to cut around the deposited layer; 4)

tilting 58 degrees and cutting at the bottom of the sample; 5) placing the sample to the original position and welding one end of the sample to a probe; 6) cutting the arm on the left side of the sample; 7) placing the sample attached to the probe on the cross sectional surface of a half TEM grid, followed by welding to that surface; 8) cutting off the probe; 9) thinning the cut sample (4×12×12 microns) on the TEM grid by the following condition: 40 kV and 3.55 nA to about 0.7 microns thickness; 40 kV and 0.67 nA to around 200 nm thickness; 40 kV and 0.07 nA to less than 100 nm thickness; final cleaning the cut surfaces at 5 kV and 0.03 nA.

Electrical Conductivity Measurement

The conductivity of a NiO and LNO bar sample having of 25.8 mm×2.9 mm×5.0 mm was measured using a standard four-probe method in air and Ar from 550° C. to 850° C. with the E-I module in the CorrWare software within a Solartron 1287/1260 electrochemical workstation system.

RESULTS $CO_2/O_2$ Permeation Rate Vs. Temperature

Figure 2A:
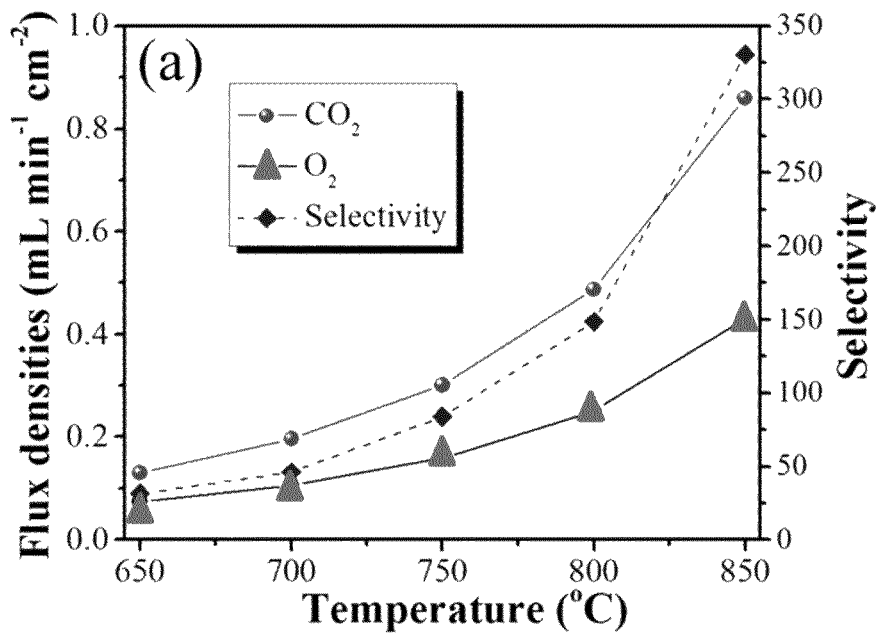
FIG. 2(a) is a graph showing the $CO_2$ and $O_2$ flux densities and $(CO_2+O_2)/N_2$ selectivity versus temperature for an MECC membrane contemplated by the present invention.
Figure 2B:
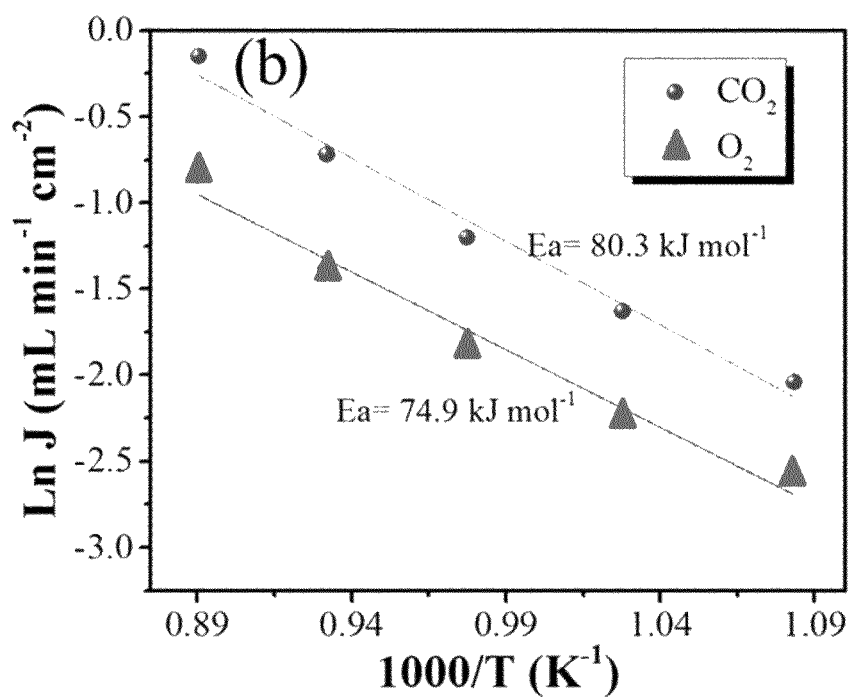
FIG. 2(b) is a graph of the Arrhenius plots of the flux for $CO_2$ and $O_2$ for a lithiated NiO-molten carbonate (MC) MECC membrane contemplated by the present invention.

The initial "pre-activation" flux performance of a lithiated NiO-MC (NiO:MC=60:40 (vol %)) MECC membrane with a thickness of 1.0 mm is shown in FIG. 2(a) as a function of temperature, where a simulated flue gas containing a simulated flue gas 75% $N_2$, 15% $CO_2$ and 10% $O_2$ is used as the feed gas and Ar as the sweep gas for the permeation. As expected, $CO_2$ and $O_2$ flux densities increase with temperature, as shown in FIG. 2(a), suggesting that the transport of $CO_2/O_2$ is a thermally activated process. Meanwhile, the ratio between $CO_2$ and $O_2$ flux is very close to 2:1, inferring that the prevalent surface reaction is $CO_3^{2-}=CO_2+\frac{1}{2}O_2+2e^-$. This is also indirectly confirmed by the close activation energies for $CO_2$ and $O_2$ flux, which are 80.3 kJ/mol for $CO_2$ and 74.9 kJ/mol for $O_2$, as shown in FIG. 2(b), implying that the transport of $CO_2$ and $O_2$ is closely coupled by the above surface reaction. Early study has suggested that the co-permeated $CO_2$ and $O_2$ can be recycled back to an oxy-combustion chamber or instantly react with a fuel such as $H_2$ or syngas to produce a pure stream of $CO_2+H_2O$ for either $CO_2$ capture or co-electrolysis. Therefore, both $CO_2$ and $O_2$ are considered in this study useful products of the capture process.

The theoretical selectivity of $CO_2+O_2$ for this electrochemical membrane should be 100% since only $CO_3^{2-}$ is allowed to pass through the dense MECC membrane. However, in reality there is always a small fraction of physical leakage associated with the membrane or gas seals, inadvertently mixing $N_2$ into the permeated $CO_2+O_2$ stream and lowering product purity. To better evaluate the leakage issue and thus product selectivity, we use the ratio of $(CO_2+O_2)$ flux density sum $(J_{CO2}+J_{O2})$ over $N_2$ flux density $(J_{N2})$, $(J_{CO2}+J_{O2})/J_{N2}$, as a measure of the selectivity for MECC membranes; the results are co-plotted with flux density in FIG. 2(a). It is evident that by increasing the temperature from 650° C. to 850° C., the $(CO_2+O_2)/N_2$ selectivity increases from 31 to 331. The lowest $(CO_2+O_2)/N_2$ selectivity of 31 is observed at 650° C., which corresponds to the lowest $J_{CO2}+J_{O2}$ (=0.204 mL min$^{-1}$ cm$^{-2}$) and highest $N_2$ concentration of 0.012% (equivalent to a $J_{N2}$=0.0066 mL min$^{-1}$ cm$^{-2}$). The highest $(CO_2+O_2)/N_2$ selectivity of 331 is achieved at 850° C., which corresponds to the highest $J_{CO2}+J_{O2}$ (=1.291 mL min$^{-1}$ cm$^{-2}$) and lowest $N_2$ concentration of 0.007% (equivalent to a $J_{N2}$=0.0039 mL min$^{-1}$ cm$^{-2}$). A better sealing and higher $J_{CO2}+J_{O2}$ at higher temperatures are two leading reasons for the higher selectivity.

Given the fact that NiO is by no means a good electronic conductor, all of the data shown so far suggest that there should be a new phase formed during operation with better electronic conductivity responsible for fast e$^-$ conduction needed for the co-reduction of $CO_2$ and $O_2$ into $CO_3^{2-}$. The flux also increases with, which suggests that the formation of this electron conducting phase is kinetically limited. Upon full formation, the activation energy for $CO_2/O_2$ transport is also reduced. The data presented in FIGS. 2(a) and 2(b) was taken from the beginning of the test for the purpose of demonstrating a functional membrane. In the following discussion section, time-dependent flux will be shown and experimental evidence will be provided to exclusively elucidate the chemistry of the self-formed e$^-$-conducting phase.

Effect of NiO/MC Volumetric Ratio

Figure 3:
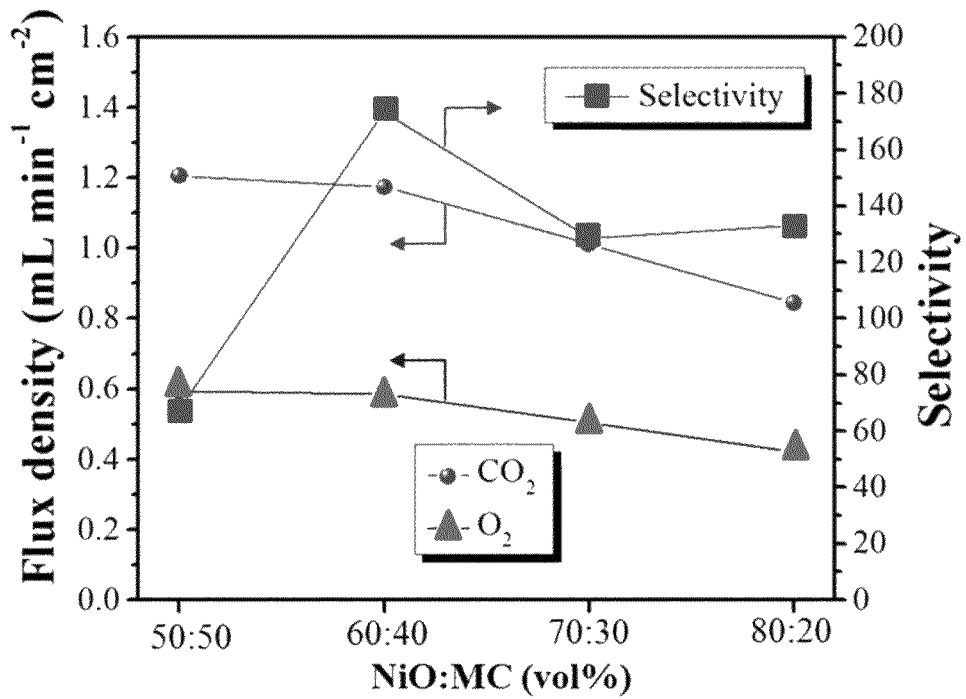
FIG. 3 is a graph illustrating the effect of NiO:MC (volume %) on the flux and $(CO_2+O_2)/N_2$ selectivity of a lithiated NiO-MC membrane contemplated by the present invention.

Since the membrane is a dual-phase composite, the volumetric ratio of the two phases may have impact on the performance. FIG. 3 shows the flux/selectivity at different volumetric NiO:MC ratios measured at 850° C. Given the "activation" behavior of the membrane, the flux/selectivity was taken at about 15 hour marker for comparison. Generally, a flux-improving "activation" period in the first 5-45 hours is observed. This improving flux behavior is associated with the growing formation of interphase between NiO and MC, which will be discussed in more detail below. To ensure fair evaluation, the thickness of all the membranes was kept constant at 1.0 mm, while the volumetric ratio of NiO:MC was varied from 50:50 to 80:20. The results in FIG. 3 suggest that the membrane with NiO:MC=60:40 yields a reasonably high $CO_2$ flux density (1.20 mL min$^{-1}$ cm$^{-2}$) and best selectivity (about 180). Therefore, the NiO:MC=60:40 membrane was selected for further studies.

Effect of Membrane Thickness

The effect of membrane thickness can be theoretically predicted from modified Wagner equation describing the permeation flux in the bulk of a dual-phase e$^-$/$CO_3^{2-}$ conducting membrane:

$$J_{CO_2} = -\frac{3RT}{8F^2L} \frac{(\varepsilon/\tau_p)\sigma_{CO_3^{2-}}((1-\varepsilon)/\tau_s)\sigma_{e^-}}{(\varepsilon/\tau_p)\sigma_{CO_3^{2-}}+((1-\varepsilon)/\tau_s)\sigma_{e^-}} \ln\frac{P''_{CO_2}P''^{1/2}_{O_2}}{P'_{CO_2}P'^{1/2}_{O_2}} \quad (3)$$

where $\varepsilon$ is the porosity of the porous NiO matrix; $\tau_p$ and $\tau_s$ are the tortuosity of pore (or MC phase) and solid NiO phases, respectively; R is the gas constant, 8.314 J mol$^{-1}$ K$^{-1}$; T is the absolute temperature, K; F is Faraday's constant, 96485 C mol$^{-1}$; L is the thickness of the membrane, cm; $\sigma_{CO_3^{2-}}$ and $\sigma_{e^-}$ are the partial conductivities of $CO_3^{2-}$ and e$^-$ in S cm$^{-1}$, respectively; $P_{CO_2}'$, $P_{O_2}'$, and $P_{CO_2}''$, $P_{O_2}''$ are the partial pressures of $CO_2$ and $O_2$ in Pa at the feed and permeate sides, respectively. Since $$\left(\frac{1-\varepsilon}{\tau_s}\right)\sigma_{e^-} \gg (\varepsilon/\tau_p)\sigma_{CO_3^{2-}}$$

for all the measuring conditions, equation (3) can be simplified into $$J_{CO_2} = -\frac{3RT}{8F^2}\frac{\varepsilon}{\tau_p}(\sigma_{CO_3^{2-}})\left(\ln\frac{P''_{CO_2}P''^{\frac{1}{2}}_{O_2}}{P'_{CO_2}P'^{\frac{1}{2}}_{O_2}}\right)\left(\frac{1}{L}\right) \quad (4)$$

According to the stoichiometry requirement, $$J_{O_2} = \frac{1}{2} J_{CO_2}.$$

Figure 4:
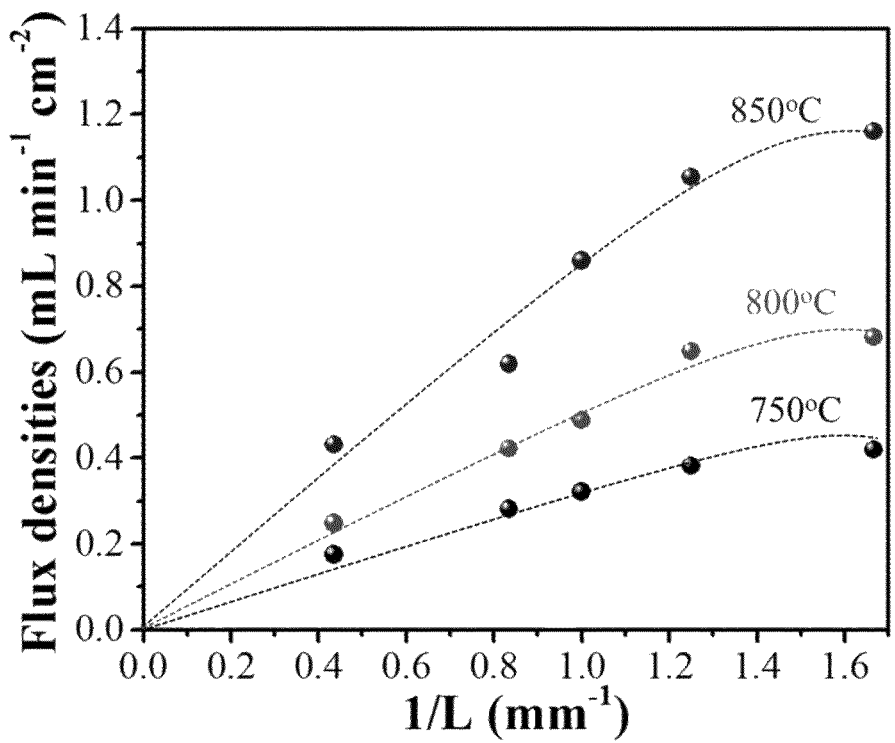
FIG. 4 is graph illustrating the $CO_2$ flux density versus 1/L at three different temperatures for a MECC membrane contemplated by the present invention.

Since R, T, F, ε, $\tau_p$, $P_{CO_2}'$ and $P_{O_2}'$ are constant for a given membrane and testing condition, eq. (2) indicates that the $CO_2$ flux density is proportional to 1/L, if $P_{CO_2}''$ and $P_{O_2}''$ at the permeant side vary within a small range. A plot of initially measured (before activation) $J_{CO_2}$ vs 1/L is shown in FIG. 4, where a linear relationship is observed in a thickness range of about 0.80 mm to about 2.35 mm. As a rough estimate to the reasonableness of the measured values, we take ε and $\tau_p$ as 0.40 and 8.5, respectively, for the NiO matrix based on our early study, the calculated slope of $J_{CO2}$ vs. 1/L at 750° C. is about 0.249 mL min$^{-1}$ cm$^{-1}$, which is close to the experimental 0.322 mL min$^{-1}$ cm$^{-1}$ shown in FIG. 4. At 800° C. and 850° C., the theoretically calculated slopes using the same c and $\tau_p$ are 0.273 and 0.277 mL min$^{-1}$ cm$^{-1}$, respectively, which are few times smaller than the experimental 0.509 and 0.745 mL min$^{-1}$ cm$^{-1}$, respectively. The deviation could well be resulted from the fact that the continuously growing interphase has changed the microstructural parameters such as reduction in $\tau_p$, which leads to a higher slope observed in FIG. 4 than the theoretical prediction with the assumption of unchanged microstructure. On the other hand, the leveling off of flux at the smallest membrane thickness (0.6 mm) suggests that the surface reaction begins to become a rate-limiting step if the membrane is too thin.

Flux Stability

Figure 5:
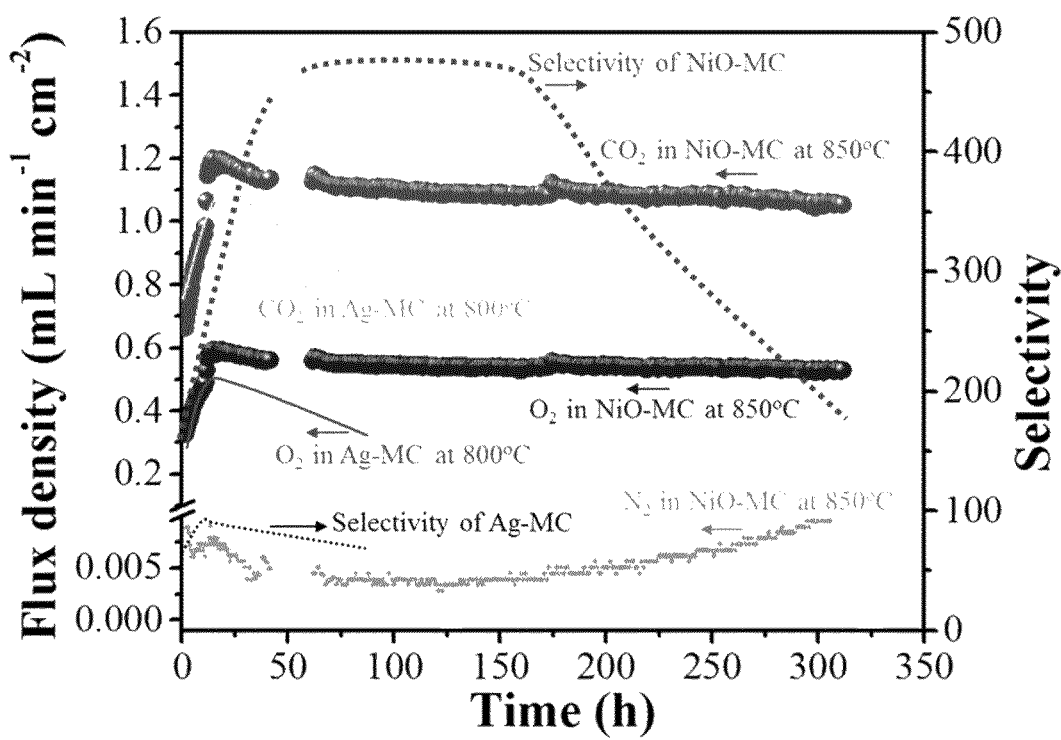
FIG. 5 is a graph comparing the $CO_2$ and $O_2$ flux densities and $(CO_2+O_2)/N_2$ selectivity between lithiated NiO-MC (NiO:MC=60:40 volume %, 1.2 millimeters thick) and ALD-$ZrO_2$ and Ag-MC membranes.

Long-term flux stability is an important property of the membrane for practical applications. Therefore, the flux stability of the lithiated NiO-MC MECC membrane (1.2 mm thick) was tested at 850° C.; the results are shown in FIG. 5. Over the 310 hour testing period, no significant degradation is observed and the ratio between $CO_2$ and $O_2$ flux remains nearly constant at about 2:1 throughout the measurement, indicating that the membrane chemistry has not changed throughout the test. The $CO_2/O_2$ flux density levels off at about 1.10 mL min$^{-1}$ cm$^{-2}$ after an initial about a 2× increase for the first 15 hours. In comparison, the $CO_2/O_2$ flux densities of a standard Ag-MC dual-phase overcoated with $ZrO_2$ nanolayer derived from atomic layer deposition (ALD) degraded much faster even at a lower temperature of 800° C. The poor stability of Ag-MC membrane is fundamentally caused by the sintering of Ag matrix. Without the ALD-$ZrO_2$ overcoat, the Ag-MC membrane would degrade even faster. One contributing factor to the sustained flux in the lithiated NiO-MC membrane is the better resistance of NiO porous matrix to sintering than silver at elevated temperatures. Within the first 15 hours, the flux density is virtually doubled, suggesting that the $CO_3^{2-}$ transport has been "activated" by the high-temperature process. The fundamental reason for the observed flux "activation" behavior is discussed in the following sections.

The selectivity of the membrane was also calculated and is plotted in FIG. 5 for comparison. It is evident that although the two membranes exhibit similar flux and trending at the beginning, the NiO-MC membrane shows a much better flux stability and selectivity than the Ag-MC membrane over an extended period. The $CO_2$ flux of the NiO-MC membrane reaches greater than 1.0 mL min$^{-1}$ cm$^{-2}$ at a selectivity ranging from about 400 to about 500 for the first 150 hours, followed by a rapid decline in selectivity that coincides with a noticeable rise in $N_2$ leakage flux. The increase in $N_2$ leakage flux is due to partial loss of MC according to the microstructural examination of a post-test membrane. Overall, the level of flux density and selectivity exhibited by the NiO-MC membrane, (i.e., flux greater than 1.0 mL min$^{-1}$ cm$^{-2}$ at selectivity 100-500 over a 310 hour period), is superior over the conventional "size-sieving" inorganic and "dissolution-diffusion" polymeric membranes.

Figure 6:
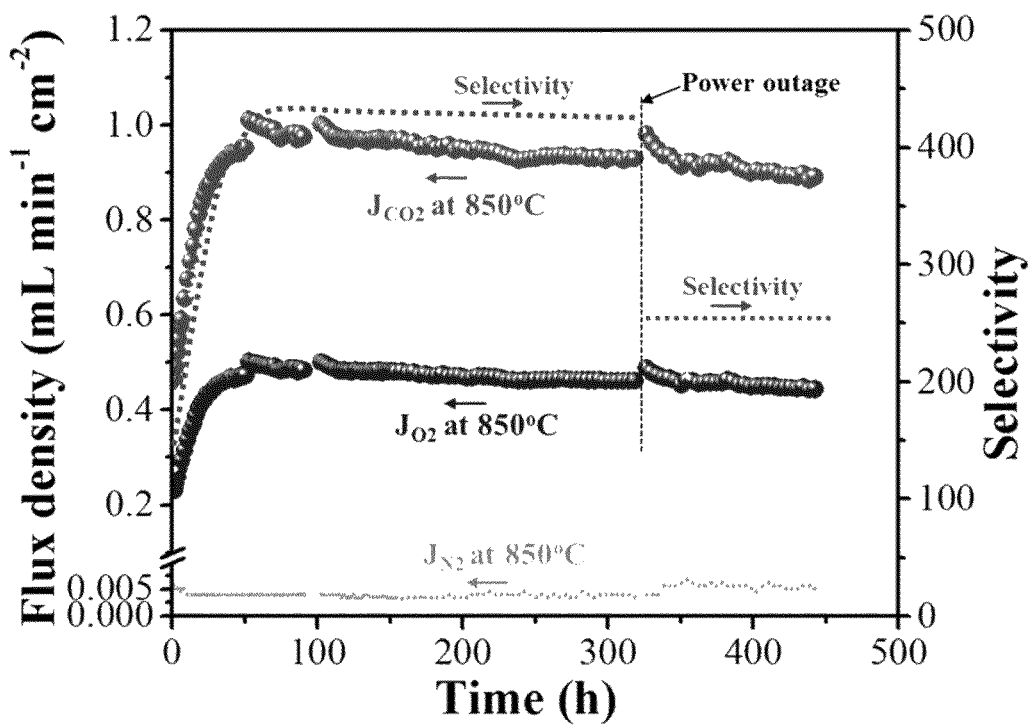
FIG. 6 is a graph illustrating the flux/selectivity stability over time of an NiO-MC (60:40 volume %) membrane contemplated by the present invention having a 2.3 millimeter thickness at 850° C.

At a higher membrane thickness (2.3 mm), FIG. 6 shows an even better long-term stability and selectivity retention over 450 hours, although the total flux is lowered somewhat compared to FIG. 5. Similar to FIG. 5, however, the membrane experiences a significant "activation" increase in flux, nearly doubling its flux during the first 20 hours, followed by leveling off at about 0.95 mL min$^{-1}$ cm$^{-2}$ for the remainder of the test. During the same period, the selectivity varies in the range of 350-450, followed by a decrease to 200-270 after an incidental power outage until the end of the test. The power outage at 320 hours causing an unexpected thermal excursion did not seem to impact the $CO_2/O_2$ flux considerably, but did increase the $N_2$ leakage rate. Therefore, it is reasonable to postulate that the decreased selectivity is related to the incident that may have induced a small damage to the membrane, causing an increase in $N_2$ leakage. Overall, a thicker membrane improves the selectivity without significantly reducing the flux density for the NiO-MC membrane. The enhanced MC retention by a thicker membrane is believed to be the reason for the extended operation and retained flux/selectivity.

To compare the flux/selectivity performance of lithiated NiO-MC membrane with that of "size-sieving" and "dissolution-diffusion" types of membranes working under a substantial pressure differential, the flux densities of $CO_2$ in FIGS. 5 and 6 have been normalized to permeance defined as $J_{CO2}/\Delta P_{CO2}$. The average $CO_2$ permeance of the lithiated NiO-MC membrane reaches $(5.22\text{-}6.12) \times 10^{-7}$ mol m$^{-2}$ s$^{-1}$ Pa$^{-1}$ at 850° C. at a selectivity of 430-470. This level of performance is significantly better than the "size-sieving" and "dissolution-diffusion" $CO_2$ separation membranes in both flux and selectivity. For example, a permeance of 2,000 Barrers (equivalent to $8.37 \times 10^{-10}$ mol m$^{-2}$ s$^{-1}$ Pa$^{-1}$) at 25° C. and $CO_2/N_2$ selectivity of 20-40, respectively, for a 70-90 μm thick microporous organic polymers (MOPs) functionalized with $CO_2$-philic pendant tetrazole groups (TZPIMs) has been previously reported. In addition, a "size-sieving" inorganic ZSM-5 zeolite nanoporous membrane with a $CO_2$ permeance of $3.6 \times 10^{-8}$ mol s$^{-1}$ m$^{-2}$ Pa$^{-1}$ at 25° C. and $CO_2/N_2$ selectivity of 54.3 has been previously reported. Compared to other types of MECC membranes, on the other hand, the lithiated NiO-MC membrane of the present invention also exhibits approximately one order of magnitude higher permeance. For example, it has been previously reported that a 0.375 mm thick $La_{0.6}Sr_{0.4}Co_{0.8}Fe_{0.2}O_{3-\delta}$-MC dual-phase membrane produced a $CO_2$ permeance of 4.77× $10^{-8}$ mol m$^{-2}$ s$^{-1}$ Pa$^{-1}$ at 850° C. with a $CO_2/N_2$ selectivity of 225. Overall, the performance of the lithiated NiO-MC membrane is superior to its rivalries, making it a promising $CO_2$ capture technology.

DISCUSSION

Microscopic Evidence of Self-Forming Electronic Phase

Figure 7A:
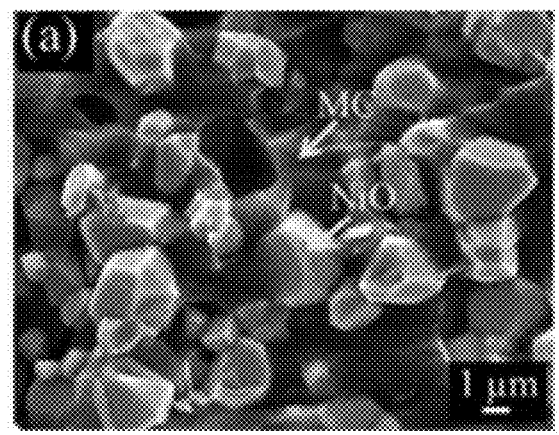
FIG. 7(a) is a scanning electron micrograph (SEM) image of an MECC membrane as contemplated by the present invention showing the MC phase uniformly distributed within the NiO matrix.
Figure 7:
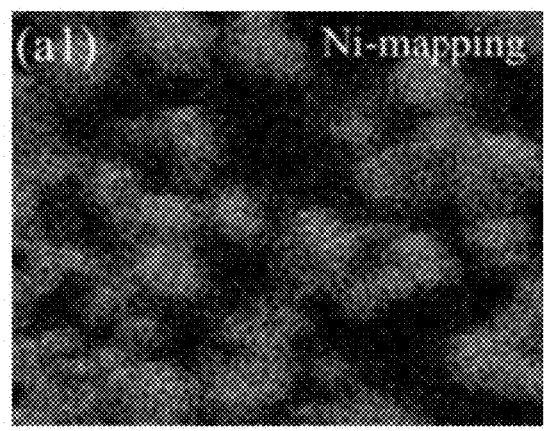
FIG. 7(a1) is an image showing the elemental mapping of the membrane shown in FIG. 7(a), where the mapping is for nickel (Ni).
Figure 7:
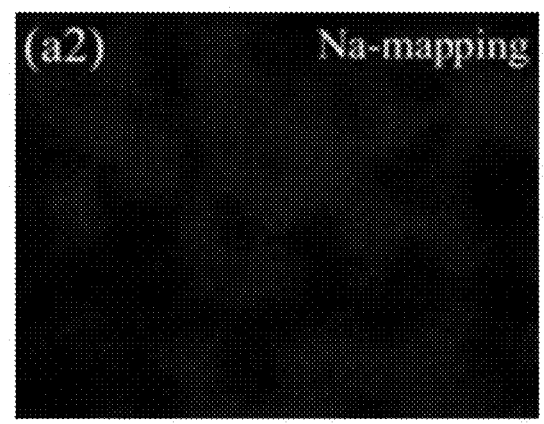
Figure 7:
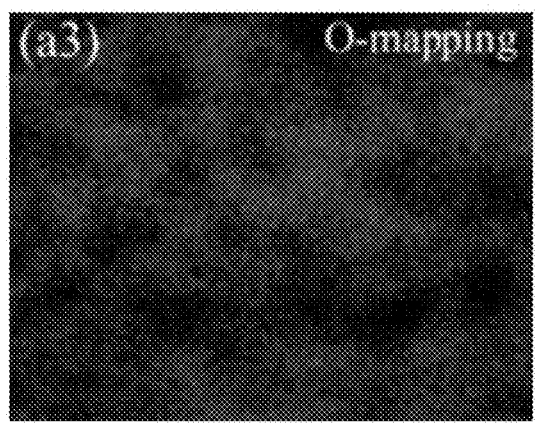
Figure 7:
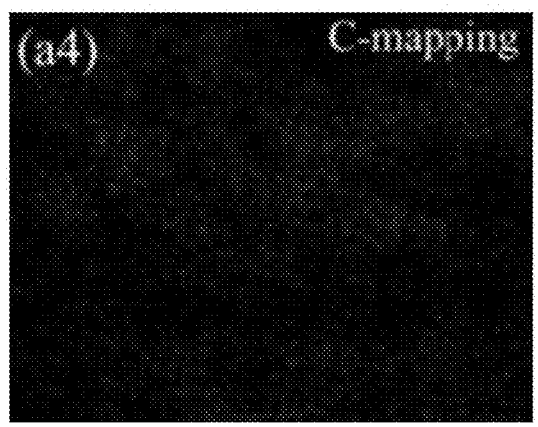
Figure 7B:
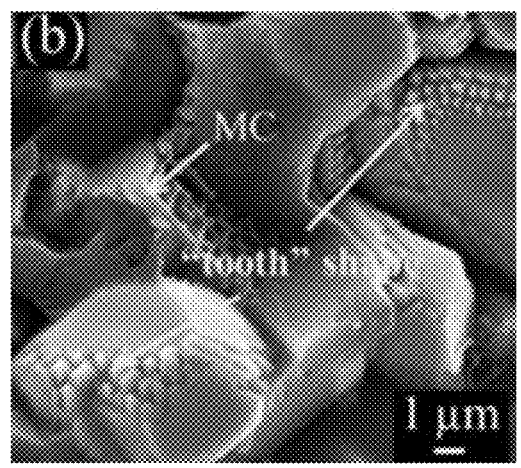
FIG. 7(b) is a scanning electron micrograph (SEM) image of an MECC membrane as contemplated by the present invention after undergoing testing for 310 hours, where the morphology is changed compared to the SEM image of FIG. 7(a).
Figure 7:
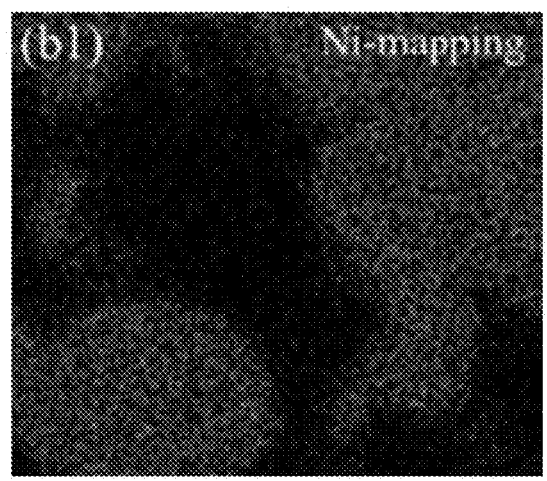
Figure 7:
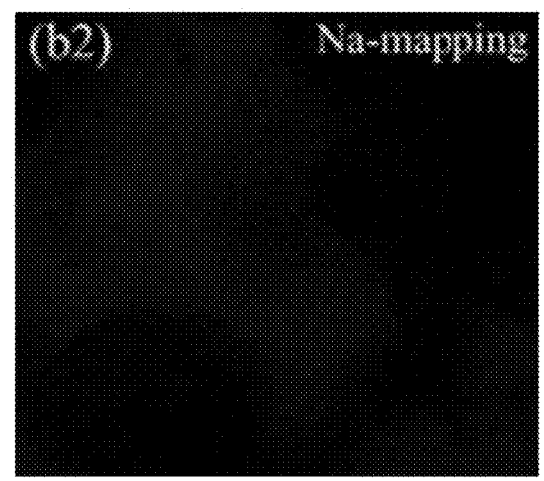
Figure 7:
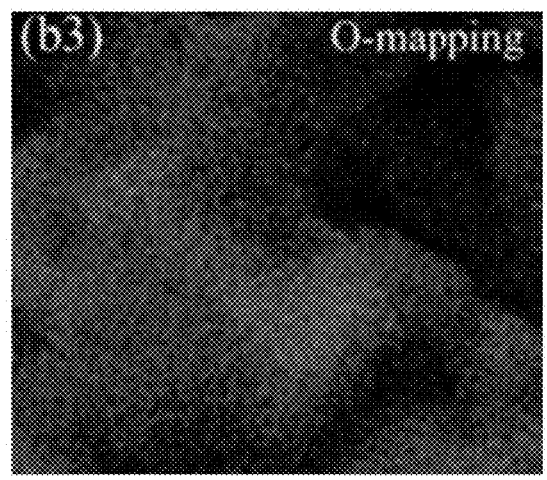
Figure 7:
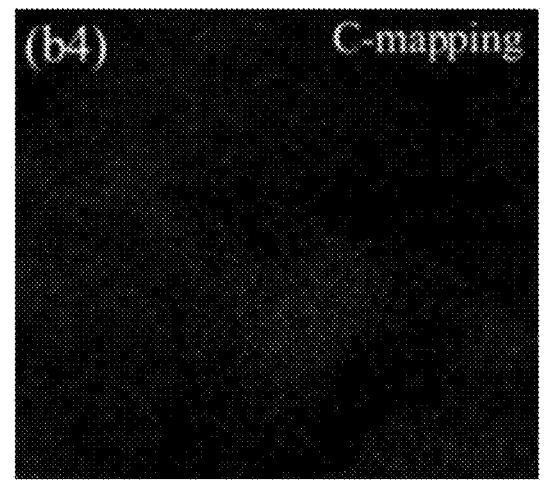

To understand the fundamental reason for the above flux behavior observed in the NiO-MC membranes, a detailed microscopic analysis on pre-test and post-test samples was performed. The original microstructure and elemental mapping of a fractured membrane before testing are shown in FIG. 7(a), where the MC phase is clearly seen distributing uniformly within the NiO matrix, forming a dense membrane with smooth interfacial boundaries. The corresponding elemental mapping in FIGS. 7(a1), 7(a2), 7(a3), and 7(a4) by EDX also confirms that both MC and NiO phase are well distributed in the membrane. In comparison, the same membrane after testing for 310 hours shows drastically different morphology and chemistry. FIG. 7(b) unveils a new "tooth" like phase at the interface of NiO and MC. The corresponding elemental mapping in FIGS. 7(b1), 7(b2), 7(b3), and 7(b4) suggests that the "tooth" like phase is rich in Ni and O, but poor in Na and C. However, due to the inability of EDX to detect lighter element Li, it is not possible to exclusively pinpoint the true composition of the interfacial phase (or interphase) formed.

Figure 8A:
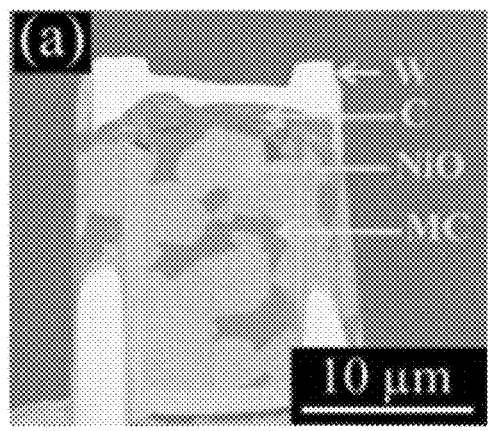
FIG. 8(a) is a photograph of a lifted focused ion beam (FIB) sample acquired from an MECC membrane as contemplated by the present invention after 310 hours of stability testing at 850° C.
Figure 8B:
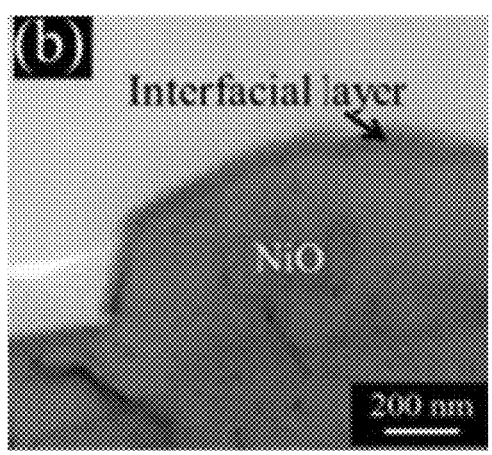
FIG. 8(b) is a transmission electron microscopy (TEM) image of the sample of FIG. 8(a) illustrating the presence of an interfacial layer with about a 100 nanometer (nm) thickness formed on top of NiO grain.
Figure 8C:
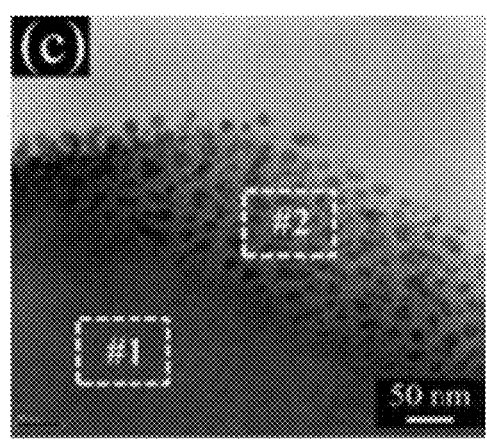
FIG. 8(c) is a transmission electron microscopy (TEM) image of the sample of FIG. 8(a) at a higher magnification than FIG. 8(b), illustrating that the new phase appears to contain at least two phases.
Figure 8D:
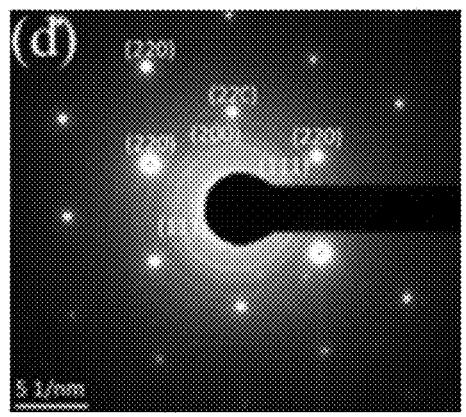
FIG. 8(d) is an image showing a selected area electron diffraction (SAED) pattern derived from spot #1 of FIG. 8(c).
Figure 8E:
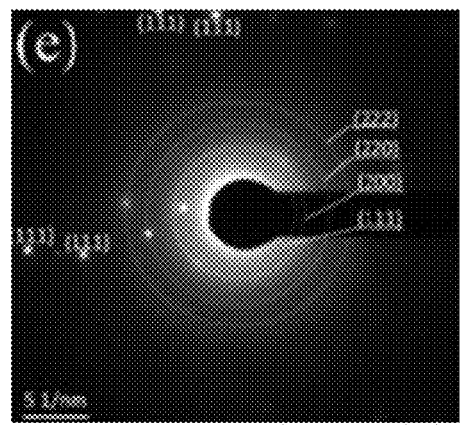
FIG. 8(e) is an image showing an SAED pattern derived from spot #2 of FIG. 8(c).
Figure 8F:
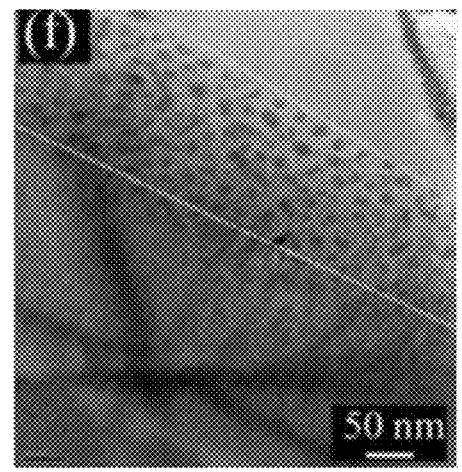
FIG. 8(f) is a transmission electron microscopy (TEM) image of spot #1 from the membrane shown in FIG. 8(c).
Figure 8G:
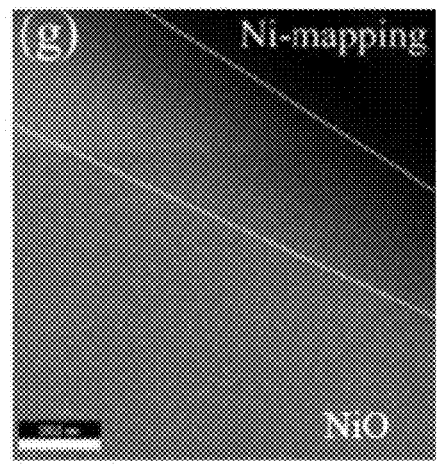
FIG. 8(g) is an image showing the elemental mapping of spot #1 from the membrane shown in FIG. 8(c), where the mapping is for nickel (Ni).
Figure 8H:
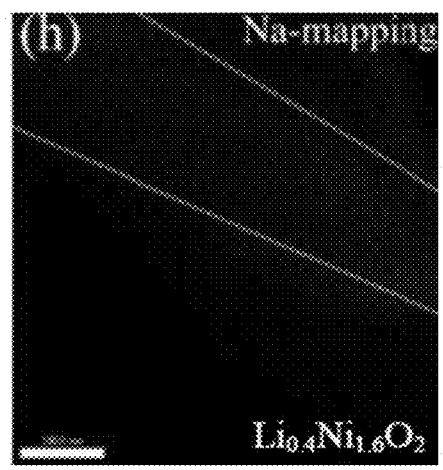
FIG. 8(h) is an image showing the elemental mapping of spot #1 from the membrane shown in FIG. 8(c), where the mapping is for sodium (Na).
Figure 8I:
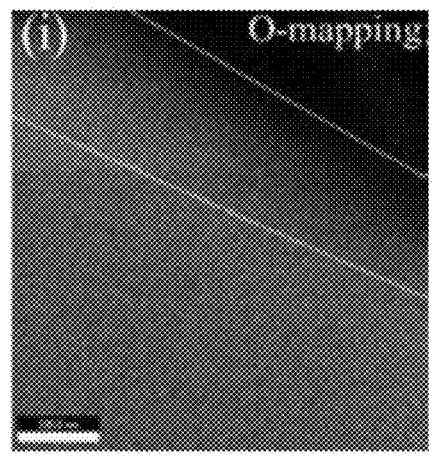
FIG. 8(i) is an image showing the elemental mapping of spot #1 from the membrane shown in FIG. 8(c), where the mapping is for oxygen (O).
Figure 8J:
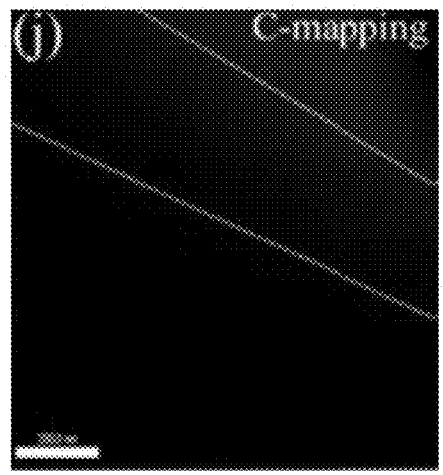
FIG. 8(j) is an image showing the elemental mapping of spot #1 from the membrane shown in FIG. 8(c), where the mapping is for carbon (C).

To further examine the morphology and chemistry of this new interfacial phase, STEM imaging/EDX of a sample prepared by Focused Ion Beam (FIB) technique was performed. FIG. 8(a) shows a picture of the lifted FIB sample for TEM imaging/EDX. It confirms from FIG. 8(b) that there is indeed an interfacial layer with about a 100 nm thickness formed on top of NiO grain. A close look at the new interphase at a higher magnification, FIG. 8(c), seems to suggest that the new phase contains at least two phases. The selected area electron diffraction (SAED) on spot #1 and #2 in FIG. 8(c) reveals that the diffraction rings can be indexed into (111), (200) and (220) reflections with face-centered cubic structure for both spots (see FIGS. 8(d), 8(e), and 8(f)). Referring The calculated d-spacing for (111), (200) and (220) reflections on spot #1 are 2.40, 2.01 and 1.47 Å, respectively, which are identical to those of NiO, confirming that the spot #1 is NiO. Similarly, the calculated d-spacing of (111), (200), (220) and (222) reflections on spot #2 are 2.39, 2.05, 1.46 and 1.19 Å, respectively, which matches well with those of the $Li_{0.4}Ni_{1.6}O_2$, suggesting that the spot #2 is $Li_{0.4}Ni_{1.6}O_2$. A further elemental mapping of Ni, Na, O and C on the interphase (spot #1) in FIGS. 8(g), 8(h), 8(i), and 8(j) reveals that the interphase is a Ni and O rich, but C and Na lean phase, suggesting that the interphase is lack of carbonate. The underlying layer (spot #2), on the other hand, has a homogenous distribution of Ni and O, but without Na and C, confirming that it is indeed NiO. Overall, the microscopic study unveils a new phase at the NiO/MC interface in a post-test sample and the main composition of the new interphase is likely to be $Li_{0.4}Ni_{1.6}O_2$ with minor residual MC phase. However, since EDX cannot detect element Li, the true composition of the interfacial layer needs to be further determined.

X-Ray Diffraction

To determine the composition of the interphase, we performed an in situ high-temperature X-ray diffraction (HT-XRD) analysis on a NiO—$Li_2CO_3$ (NiO:$Li_2CO_3$=1.6:0.22 mol) mixture in a temperature range of room temperature to 850° C. and air. The collected XRD patterns are shown in FIG. 9 (a) as a function of temperature. There are two phases, namely NiO and $Li_2CO_3$ (the main component of the MC phase), found from RT to 650° C. However, at 750° C., the carbonate phase disappears and a new phase that can be indexed as $Li_{0.4}Ni_{1.6}O_2$ (LNO) appears in addition to NiO, implying that the $Li_2CO_3$ phase has reacted with NiO to form LNO. At a higher temperature of 850° C., only the LNO phase is left. Upon cooling, the LNO phase remains present, suggesting that LNO is a thermodynamically stable phase. Therefore, it is reasonable to believe that the reaction temperature between NiO and $Li_2CO_3$ is within about 650° C. and about 750° C. A further comparison of HT-XRD patterns collected at 500° C. during heating (before reaction) and cooling (after reaction) is given in FIG. 9 (b), compellingly suggest that the formation of LNO phase is thermodynamically stable and irreversible.

It is also noted from FIG. 9(b) that the main peaks of LNO shift to higher 2θ compared to NiO, implying a reduction in lattice cell of the new phase. This can be explained by the fact that the substitution of larger Li$^+$ ($r_{Li^+}$=0.76 Å) into the NiO lattice oxidizes Ni$^{2+}$ ($r_{Ni^{2+}}$=0.69 Å) into Ni$^{3+}$ ($r_{Ni^{3+}}$=0.56 Å), yielding $r_{Li^+}+r_{Ni^{3+}}<2\ r_{Ni^{2+}}$ and thus a smaller cell. Further, ex-situ XRD analysis on a simple mixture of $Li_2CO_3$ and NiO in 0.22:1.60 (mol %) fired at 800° C. in $O_2$ for 5 hours as well as a real NiO-MC (52 mol % $Li_2CO_3$—$Na_2CO_3$) mixture fired in air at 850° C. for 10 hours all confirmed the formation of a pure $Li_{0.4}Ni_{1.6}O_2$ phase.

Electrical Conductivity

Thus far, it has been confirmed that the new phase formed at NiO and MC interface is $Li_{0.4}Ni_{1.6}O_2$ (LNO). A natural question to ask at this point is whether this phase responsible for the electronic conduction needed for $CO_2/O_2$ co-reduction to $CO_3^{2-}$. To answer this question, we separately synthesized a LNO bar sample and measured its electrical conductivity with 4-probe techniques from 550° C. to 850° C. in air and argon (Ar). The results are presented in FIG. 10, where the conductivity of LNO is shown to be nearly three orders of magnitude higher than NiO in both air and Ar (even though there is a slight decrease in conductivity above 750° C.), confirming that LNO is indeed an excellent conductor. Specifically, the LNO has a conductivity in air or Ar ranging from about 200 S/cm to about 260 S/cm at temperatures ranging from about 550° C. to about 850° C. Further, the very small activation energy (about 0.040 eV for LNO and about 0.080 eV for NiO) suggests that the electrical conduction in LNO is electronic in nature. Overall, this electrical conductivity measurement confirms that LNO is indeed a highly conductive phase and responsible for the observed $CO_2$ transport in the NiO-MC based MECC membrane contemplated by the present invention.

CONCLUSION

In summary, this Example demonstrates a new type of low-cost and easy-to-fabricate self-forming NiO-MC based MECC membrane for high-flux and selective electrochemical $CO_2$ capture from flue gas. The highly electron conducting phase $Li_{0.4}Ni_{1.6}O_2$ (LNO) is formed in situ at the interface of NiO and MC during high temperature operation. Such a self-forming MECC membrane exhibits excellent $CO_2/O_2$ flux density and selectivity with outstanding stability. Given the fact that NiO is resistant to sintering and cost effective compared to silver, the NiO-MC based MECC membrane could replace the expensive Ag-MC rivalry and be a promising practical membrane candidate for advanced $CO_2$ membrane reactors.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A membrane for carbon dioxide and oxygen separation comprising:

a solid porous matrix, wherein the solid oxide matrix comprises a metal oxide, wherein the metal oxide comprises nickel oxide, iron oxide, manganese oxide, cobalt oxide, or copper oxide;

a molten carbonate phase, wherein the molten carbonate phases comprises a lithium carbonate;

and an interphase disposed between the solid porous matrix and the molten carbonate phase, wherein the interphase is formed at a temperature ranging from about 650° C. to about 850° C. and has a thickness ranging from about 50 nanometers to about 150 nanometers, wherein the membrane is a mixed electron and carbon-ion conductor membrane, and wherein the membrane exhibits a selectivity for carbon dioxide and oxygen over nitrogen ranging from about 100 to about 500 at a temperature of about 850° C.

2. The membrane of claim 1, wherein the solid porous matrix is impregnated with the molten carbonate phase.

3. The membrane of claim 1, wherein a volume % ratio of the solid porous matrix to the molten carbonate phase is from about 1.1 to about 1.8 prior to activation of the membrane by application of heat.

4. The membrane of claim 1, wherein the interphase is self-formed upon increasing the temperature of the membrane to a temperature ranging from about 650° C. to about 850° C.

5. The membrane of claim 1, wherein the interphase comprises a lithiated metal oxide a having the following formula: $Li_xB_{2-x}O_2$, wherein B is nickel, iron, manganese, cobalt, or copper.

6. The membrane of claim 5, wherein the lithiated metal oxide comprises $Li_{0.4}Ni_{1.6}O_2$.

7. The membrane of claim 1, wherein the membrane has a thickness ranging from about 0.6 millimeters to about 4 millimeters.

8. The membrane of claim 1, wherein the membrane exhibits a carbon dioxide flux density ranging from about 0.95 milliliters/(minute·cm$^2$) to about 1.5 milliliters/(minute·cm$^2$) at a temperature of about 850° C.

9. A method of forming a membrane for carbon dioxide separation comprising:

forming a solid porous matrix, wherein the solid oxide matrix comprises a metal oxide, wherein the metal oxide comprises nickel oxide, iron oxide, manganese oxide, cobalt oxide, or copper oxide;

impregnating the solid porous matrix with a molten carbonate phase, wherein the molten carbonate phase comprises a lithium carbonate; and heating the molten carbonate phase impregnated solid porous matrix to a temperature ranging from about 650° C. to about 850° C., wherein an interphase is formed in situ between the solid porous matrix and the molten carbonate phase, wherein the interphase has a thickness ranging from about 50 nanometers to about 150 nanometers, wherein the membrane is a mixed electron and carbon-ion conductor membrane.

10. The method of claim 9, wherein the membrane exhibits a selectivity for carbon dioxide and oxygen over nitrogen ranging from about 100 to about 500 at a temperature of about 850° C.

11. The method of claim 9, wherein the interphase comprises a lithiated metal oxide having the following formula: $Li_xB_{2-x}O_2$, wherein B is nickel, iron, manganese, cobalt, or copper.

12. The method of claim 11, wherein the lithiated metal oxide comprises $Li_{0.4}Ni_{1.6}O_2$.

13. The method of claim 9, wherein the membrane has a thickness ranging from about 0.6 millimeters to about 4 millimeters.

14. The method of claim 9, wherein the membrane exhibits a carbon dioxide flux density ranging from about 0.95 milliliters/(minute·cm$^2$) to about 1.5 milliliters/(minute·cm$^2$) at a temperature of about 850° C.

15. The method of claim 9, wherein a volume % ratio of the solid porous matrix to the molten carbonate phase is about 1.1 to about 1.8 prior to heating the molten carbonate phase impregnated solid porous matrix.

16. A method of separating carbon dioxide, oxygen, or a combination thereof from a stream of flue gas, the method comprising contacting the stream of flue gas with the membrane of claim 1.

* * * * *